US006841270B2

(12) United States Patent
Li et al.

(10) Patent No.: US 6,841,270 B2
(45) Date of Patent: Jan. 11, 2005

(54) ORGANIC LIGHT-EMITTING DEVICE HAVING PYRYLIUM SALT AS CHARGE TRANSPORT MATERIAL

(75) Inventors: Xiao-Chang Charles Li, Union City, CA (US); Kazunori Ueno, Kanagawa (JP); Akihito Saitoh, Kanagawa (JP); Hiroshi Tanabe, Kanagawa (JP); Tadashi Okamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/417,128

(22) Filed: Apr. 17, 2003

(65) Prior Publication Data

US 2004/0209114 A1 Oct. 21, 2004

(51) Int. Cl.$^7$ .............................................. H05B 33/14
(52) U.S. Cl. ....................... 428/690; 428/917; 313/504; 313/506
(58) Field of Search ................................. 428/690, 917; 313/504, 506

(56) References Cited

U.S. PATENT DOCUMENTS

| | | | |
|---|---|---|---|
| 3,615,414 A | 10/1971 | Light ............................ 96/1.6 |
| 3,697,528 A | 10/1972 | Andrews et al. ........... 260/294.9 |
| 4,175,960 A | 11/1979 | Berwick et al. ................ 430/58 |
| 4,424,268 A | 1/1984 | Berwick et al. ................ 430/83 |
| 4,584,258 A | 4/1986 | Detty et al. .................... 430/270 |
| 4,767,826 A | 8/1988 | Liang et al. ................... 525/421 |
| 4,769,292 A | 9/1988 | Tang et al. ..................... 428/690 |
| 4,916,127 A | 4/1990 | Detty ............................. 514/183 |
| 5,079,128 A | 1/1992 | Katagiri et al. ................ 430/269 |
| 5,278,026 A | 1/1994 | Katagiri et al. ................ 430/269 |
| 5,443,922 A | 8/1995 | Nishizaki et al. .............. 428/690 |
| 5,817,430 A | 10/1998 | Hsieh ............................ 428/690 |
| 5,846,666 A | 12/1998 | Hu et al. ....................... 428/690 |
| 5,932,363 A | 8/1999 | Hu et al. ....................... 428/690 |
| 5,935,720 A | 8/1999 | Chen et al. .................... 428/690 |
| 5,989,737 A | 11/1999 | Xie et al. ...................... 428/690 |
| 6,022,961 A | 2/2000 | Yamamoto et al. ........... 536/24.3 |
| 6,048,573 A | 4/2000 | Tang et al. ..................... 427/66 |
| 6,057,048 A | 5/2000 | Hu et al. ....................... 428/690 |
| 6,066,357 A | 5/2000 | Tang et al. ..................... 427/66 |
| 6,083,651 A | 7/2000 | Kobayashi et al. .......... 430/58.15 |
| 6,215,971 B1 | 4/2001 | Sakoh et al. ................... 399/159 |
| 6,225,017 B1 | 5/2001 | Sato et al. ....................... 430/83 |
| 6,225,467 B1 | 5/2001 | Esteghamatian et al. ...... 544/180 |
| 6,228,547 B1 | 5/2001 | Kobayashi et al. .............. 430/72 |

OTHER PUBLICATIONS

Musfeld, J.L. et al., "Luminescent Polymers with Discrete Emitter Units", Journal of Polymer Science, Part B: Polymer. Physics, 32(14), p. 2395–2404, (1994).*
Bhowmik, P.K. et al., Polymer Preprints, 44(2), p. 847–848, (2003).*
Ishchenko, Alexander, Polymers for Advanced Technologies, vol. 13, p. 744–752, (2000).*
Bhowmik, P.K. et al. Polymer Preprints, 43(2), p. 987–988, (2002).*
Bhowmik, P.K. et al., Polymer, vol. 43, p. 1953–1958, (2002).*
Bhowmik, P.K. et al., Macromolecules, vol. 34, p. 7579–7581, (2001).*

* cited by examiner

*Primary Examiner*—Dawn Garrett
(74) *Attorney, Agent, or Firm*—Fitzpatrick, Cella, Harper & Scinto

(57) ABSTRACT

An organic light-emitting device (OLED) in which pyrylium salt or its derivative, such as thiapyrylium, selenapyrylium, or telluropyrylium, is used as a charge transport material and/or at least a dopant or principal component in a charge transport layers.

15 Claims, 2 Drawing Sheets

ORGANIC LIGHT-EMITTING DEVICE HAVING PYRYLIUM SALT AS CHARGE TRANSPORT MATERIAL

BACKGROUND OF THE INVENTION

1. Field of the Invention

The present invention relates to an organic light emitting device (OLED) in which a charge transport material is used as the host material and/or as the charge transport layer.

2. Description of the Related Art

Significant efforts have been expended in developing suitable materials for use in organic light emitting devices (OLEDs). Such devices are commercially attractive because they offer the promise of low-cost fabrication of high-density pixeled displays exhibiting bright electroluminescence with long life times, high efficiency and wide color range.

A typical OLED is fabricated by sandwiching an emissive layer between an anode and a cathode. Improved performance can be obtained by the provision of additional layers around the emissive layers so as to provide charge transport capabilities, such as an electron transport layer or a hole transport layer.

The stability and lifetime of an OLED may change with the various combinations of emissive material and charge transport material. As most luminescent materials have limited charge injection and transporting ability, and/or unbalanced charge injection ability in the device, the doping of emissive material (with a volume content less than 20%) into a host material can lead to much better performance because the host material can either enhance electron transport or enhance hole transport. Since electron injection of organic luminescent material has been less efficient than hole injection of organic luminescent material, host materials that have an electron enhancement function, have been widely used for high performance OLEDs. For example, U.S. Pat. No. 5,935,720 shows an OLED utilizing tris(8-hyroxyquinoline) aluminum Alq3 as host material because of its electron enhancement function. Due to its high electron affinity, Alq3 has also been widely explored as electron transport material for OLEDs.

However, recent scientific evidence showed that an OLED with Alq3 as the emissive layer and/or host material has intrinsic instability due to the poor hole injection ability of Alq3. In addition, current findings show that Alq3 has little electrochemical reversibility even under normal electrochemical reduction process.

Accordingly, because of consumer expectations of good efficiency, long lifetime and pure color for OLEDs, a need still exists for development of suitable materials used for OLEDs.

SUMMARY OF THE INVENTION

It is an object of the invention to provide an improved OLED in which pyrylium salt or its derivatives are used as the charge transport material in a pure charge transport layer or in a host material to enhance charge transport property.

Thus, in one aspect, the invention is an OLED in which an emissive layer is sandwiched between at least a cathode and an anode, and in which the OLED includes a pyrylium salt or its derivatives such as thiapyrylium, selenapyrylium, and telluropyrylium as a charge transport material. Suitable pyrylium salts and their derivatives are expressed according to the following general formula (I):

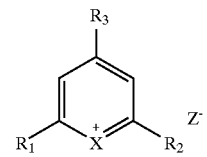

wherein $R_1$, $R_2$ and $R_3$ represent an alkyl, aryl, or heteroaryl having up to 50 carbon atoms; Z represents an anionic function-including ion, such as $Cl^-$, $Br^-$, $F^-$, tetrafluoroborate, perchlorate, methanesulfonate, or phosphohexafluoride; and X is oxygen, sulfur, or selenium. The compound expressed according to formula (I) can be used directly as transport layer, can be used as a dopant in a charge transport layer, or can be incorporated into an emissive layer as a host to enhance the emissive layer's charge transport property.

Fabrication of a suitable charge transport layer using a pyrylium salt or its derivatives according to the above formula (I) can be accomplished through use of thermal deposition in a vacuum, or by spin coating of a solution thereof. In addition, high-density pixeled displays can be fabricated through use of suitable masking procedures, or by use of thermal or piezoelectric ink jet printing techniques.

The compound expressed according to formula (I) can be used directly as the charge transport layer, or can be incorporated into a polymer as a unit or as a pendent side group. In addition, the compound of the expressed formula can be doped into a matrix medium when the charge transport layer comprises a charge transport functional material plus a dopant. Further, the compound can be used as a host to enhance charge injection and transport property wherein a dopant emitter may be doped for controlling emission color.

The compound expressed according to formula (I) exhibits characteristics of high electron affinity and excellent reversibility. Representative charge transport mechanisms are shown below in accordance with Schemes 1 and 2, which show examples of the charge injection process for 2,4,6-triphenylpyrylium salt and 4,4'-bipyryllium salt, respectively.

Scheme 1.
The charge injection process for 2,4,6-triphenylpyrilium salts.

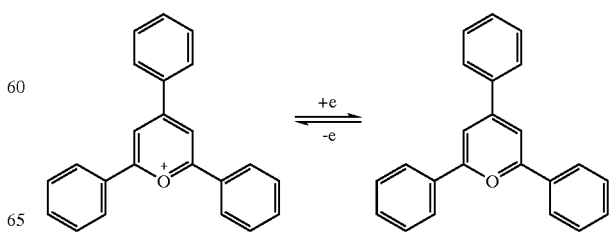

Scheme 2.
The charge injection process for a 4,4'-bipyrylium salt.

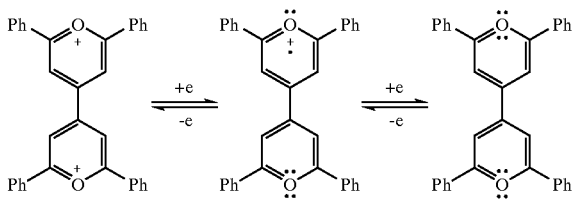

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE INVENTION

The pyrylium salt and its derivatives used in the present invention have the following general structure:

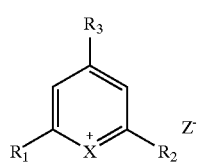

(I)

In the above formula (I), $R_1$, $R_2$ and $R_3$ represent an alkyl, aryl, or heteroaryl having up to 50 carbon atoms; Z represents an anionic function-including ion, such as Cl$^-$, Br$^-$, F$^-$, tetrafluoroborate, perchlorate, methanesulfonate, or phosphohexafluoride; and X is oxygen, sulfur, or selenium.

The compound expressed according to formula (I) exhibits characteristics of high electron affinity and excellent reversibility. Representative charge transport mechanisms are shown below in accordance with schemes 1 and 2, which show examples of the charge injection process for 2,4,6-triphenylpyrylium salt and 4,4'-bipyryllium salt, respectively.

Scheme 1.
The charge injection process for 2,4,6-triphenylpyrilium salts.

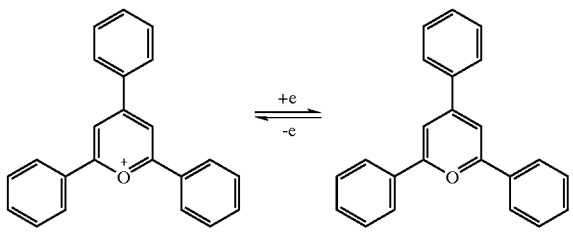

Scheme 2.
The charge injection process for a 4,4'-bipyrylium salt.

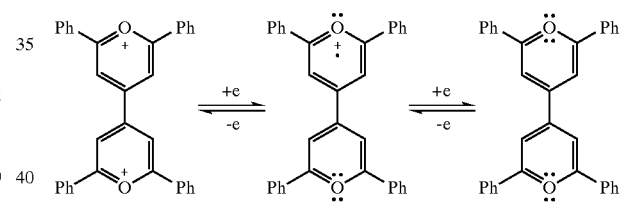

Some preferred pyrylium salts or pyrylium derivatives represented by formula (I) include the following compounds:

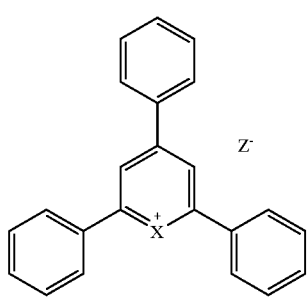

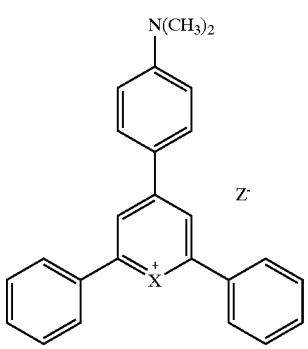

-continued
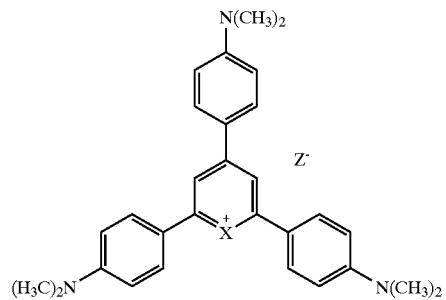
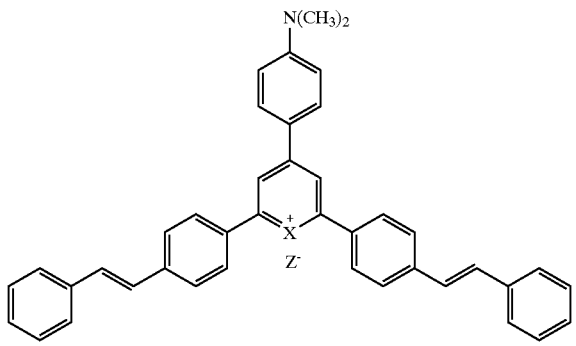
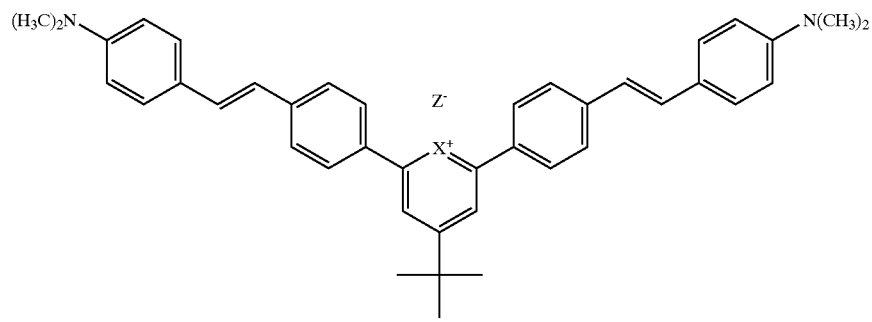
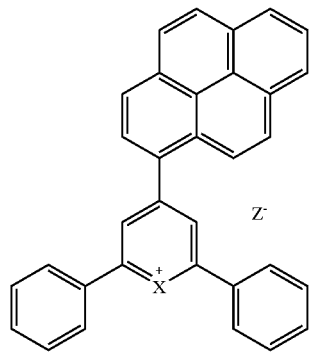
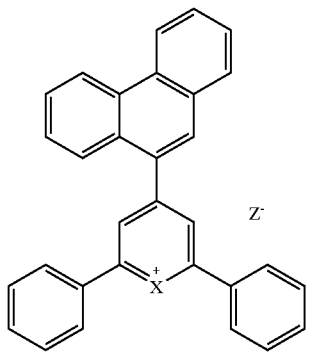
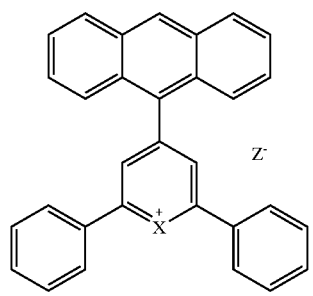
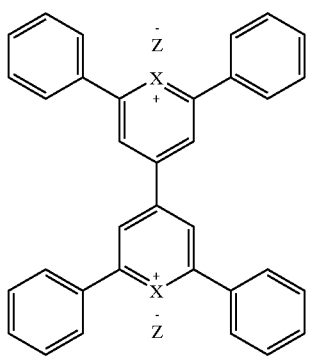

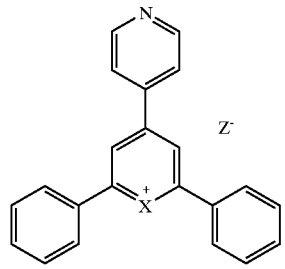
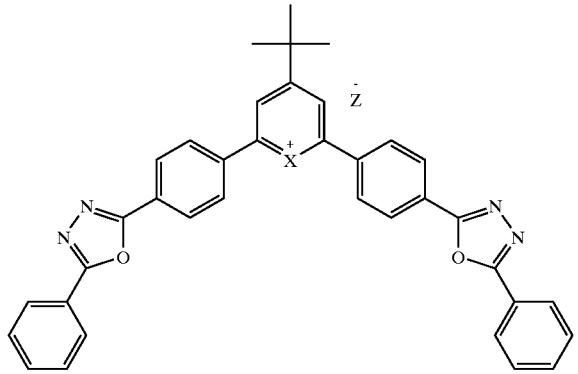

In the above preferred pyrylium salts or pyrylium derivatives, X is either O or S; and Z is an anionic function-including ion, such as Cl⁻, Br⁻, F⁻, tetrafluoroborate, perchlorate, methanesulfonate, or phosphohexafluoride.

The compound expressed according to formula (I) can be used directly as the charge transport layer, or can be incorporated into a polymer as a unit or as a pendant side group. In addition, such a pyrylium salt or pyrylium derivative can be doped into a matrix medium when the charge transport layer comprises a charge transport functional material plus a dopant. Further, the pyrylium salt or pyrylium derivative can be used as a host to enhance charge injection and transport property wherein a dopant emitter may be doped for controlling emission color.

In one typical application, the compound expressed according to the above formula (I) can be used directly as the transport layer in multi-layer devices, such as a two layer device, shown in FIG. 1, or a three layer device, shown in FIG. 2, as described more fully below.

Figure 1:
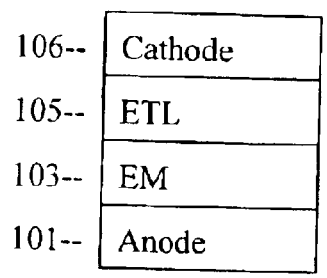
FIG. 1 is a schematic cross-sectional view of a two layer organic light emitting device.

In FIG. 1, a two layer device comprises an emissive layer 103 and an electron transport layer 105 sandwiched between a cathode 106 and an anode 101.

Figure 2:
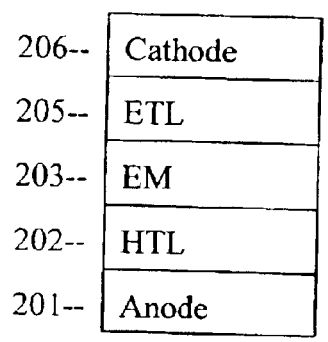
FIG. 2 is a schematic cross-sectional view of a three layer organic light emitting device.

In FIG. 2, a three layer device comprises an emissive layer 203 sanwiched between an electron transport layer 205 and a hole transport layer 202. Additionally, the emissive layer 203, electron transport layer 205 and hole transport layer 202 are sandwiched between a cathode 206 and an anode 201.

General procedures for an fabrication of an OLED are as follows: To contruct a three layer device, as in FIG. 2, a clean substrate coated with a patterned layer of indium tin oxide (ITO) is first obtained. Next, the substrate is treated with $O_2$ plasma for 1–5 minutes. Afterwards, the substrate is placed in a thermal evaporator and the pressure is lowered. Then, organic and metallic layers are evaporated onto the substrate at a rate approximately between 1–3 Å/s. These organic and metallic layers may vary depending upon the desired OLED. A hole transport layer is usually evaporated with a thickness of ~200 Å. Next, an emissive layer is evaporated with a host and dopant. Normally, 100–400 Å of the emissive layer is deposited. Then, an electron transport material is evaporated to form a layer that is usually 200–400 Å thick. After the evaporation of the preferred organic and metallic layers, a mask is placed adjacent to the layer to define where metal areas corresponding to cathodes are to be evaporated. Then, about 120 Å of a Li—Al alloy is evaporated to improve electron injection into the device. Finally, after about 1500 Å of Al is deposited, the evaporator is allowed to cool.

Fabrication of a suitable charge transport layer using a pyrylium salt or its derivatives according to the above formula (I) can be accomplished through use of thermal deposition in a vacuum, or by spin coating of a solution thereof. In addition, high-density pixeled displays can be fabricated through use of suitable masking procedures, or by use of thermal or piezoelectric ink jet printing techniques.

Figure 3:
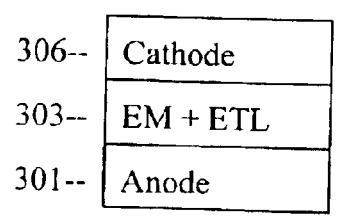
FIG. 3 is a schematic cross-sectional view of a single layer organic light emitting device.

In another typical application, the compound expressed according to the above formula (I) can be incorporated into an emissive layer as a host to enhance charge transport property in a single layer device, as shown in FIG. 3, in which the pyrylium salt or pyrylium derivative is doped into the emissive layer.

In FIG. 3, a single layer device comprises a combined layer 303, comprising an emissive layer and an electron transport layer, sandwiched between a cathode 306 and an anode 301.

COMPARATIVE EXAMPLE 1

Figure 4:
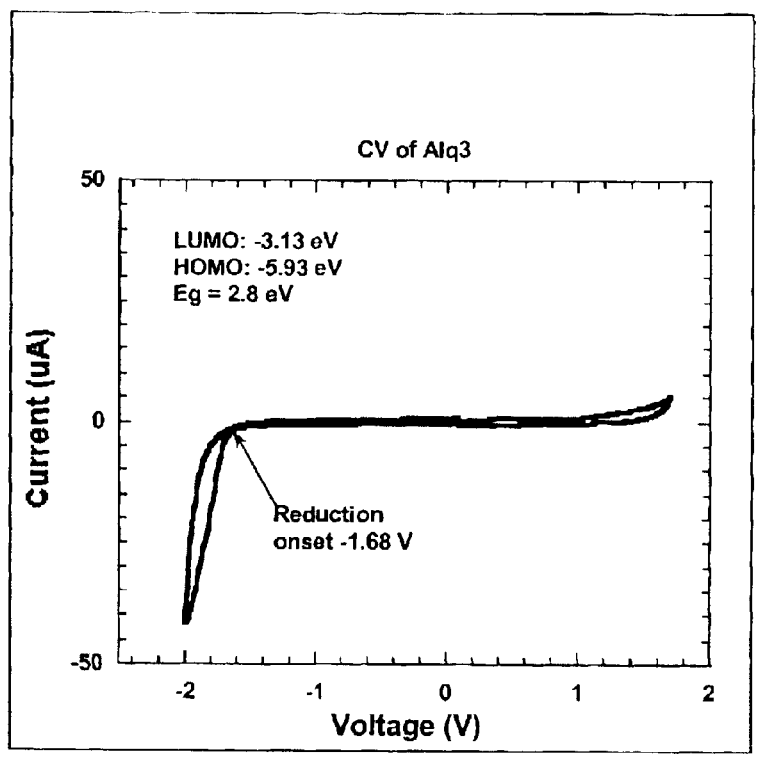
FIG. 4 illustrates the cyclic voltametric analysis curve for Alq3.

Cyclic voltametric (CV) analysis of known electron transport material, tris(8-hyroxyquinoline) aluminum (Alq3), was carried out using tetrabutylammonium tetrafluoroborate ($TBABF_4$, 0.1 M in acetonitrile) as an electrolyte, Pt as a work electrode and Ag/Ag⁺ (0.1 M) as a reference electrode at a scan speed of 100 mV/s. FIG. 4 shows the CV curve, indicating an onset reduction, or surge of reduction at the electrode surface, of −1.68 V. The lowest unoccupied molecular orbital (LUMO) was estimated according to a general formula that gives LUMO (in eV) as the difference between −4.8 and the Ered (onset reduction potential in volts) of −1.68. According to this formula, the LUMO was approximately −3.12 eV.

EXAMPLE 1

Figure 5:
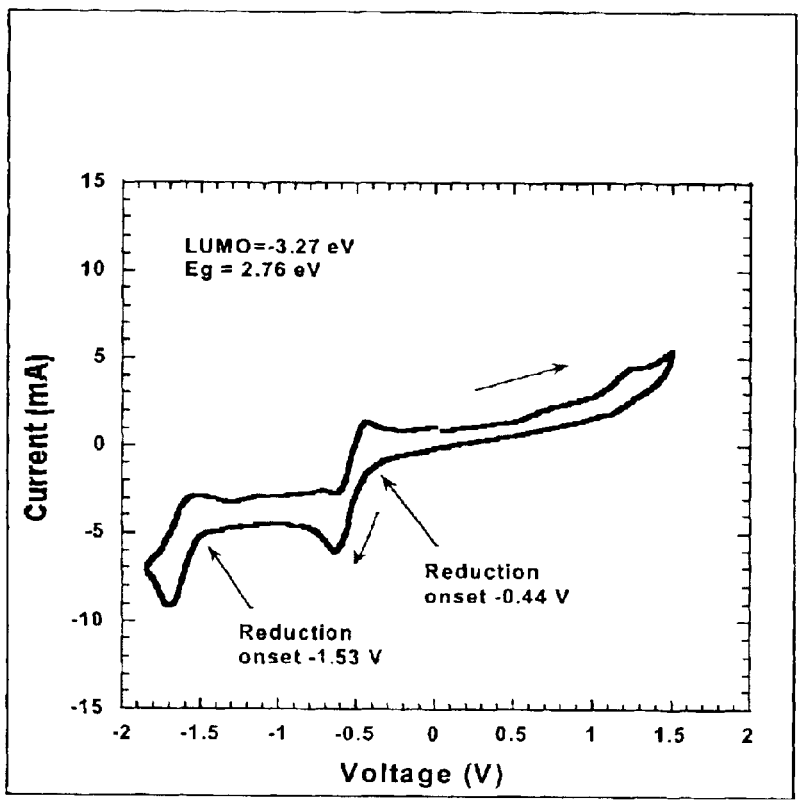
FIG. 5 illustrates the cyclic voltametric analysis curve for TPPBF$_4$.

A similar CV measurement for a pyrylium salt, 2,4,6-triphenyl pyrylium tetrafluoroborate ($TPPFB_4$), was performed according to the same conditions as above, in the measurement of Alq3. FIG. 5 shows the CV curve of the pyrylium salt, which indicates a lower onset reduction of −0.44 V and −1.53 V, demonstrating that reduction (or electron injection) is easier for pyrylium salt than Alq3. The LUMO for the pyrylium salt was −3.27 eV (using the second reduction onset for the estimation), being lower than Alq3. A CV comparison also indicates that pyrylium salt not only has lower LUMO level (easier electron injection), but also has more reversible charge injection character (more stable electrochemical property) than Alq3, as revealed by the features of both CV curves.

EXAMPLE 2

An OLED device was fabricated with the device structure of ITO/α-NPD 30 nm/Alq3+DCM2 (2%) 20 nm/$TPPFB_4$ 30 nm/Al 100 nm, in which ITO refers to indium tin oxide coated glass substrate, α-NPD refers to a hole transport layer with N,N'-Di(naphthalen-1-yl)-N,N'diphenyl-benzidine, DCM2 refers to a red dopant emitter, 4-(Dicyanomethylene)-2-methyl-6-(p-dimethylaminostyryl)-4H-pyran, and TPPFB$_4$ refers to 2,4,6-triphenyl pyrylium tetrafluoroborate as the electron transport layer. The device was fabricated according to procedures known in the art. The device emitted red light with a brightness of 315 cd/m$^2$ when a forward bias voltage of 5.2 V was applied. The brightness changed to 250 cd/m$^2$ at 5.2 V (retained 80% original brightness) after continuously working for 6 hours at 5.2 V.

COMPARATIVE EXAMPLE 2

An OLED device was fabricated in a similar manner as described in Example 2, with the exception of using Alq3 as the electron transport layer. The OLED had a device structure of ITO/α-NPD 30 nm/Alq3+DCM2 (2%) 20 nm/Alq3 30 nm/Al 100 nm. The device emitted red light with a brightness of 315 cd/m$^2$ when a forward bias voltage of 5.8 V was applied. The brightness changed to 180 cd/m$^2$ at 5.8 V (retained 58% original brightness) after continuously working for 6 hours at 5.8 V.

EXAMPLE 3

An OLED device was fabricated in a similar manner as described in Example 2, with the exception of using TPPBF$_4$ as a host material. The OLED had a device structure of ITO/α-NPD 30 nm/TPPBF$_4$+DCM2 (2%) 20 nm/TPPBF$_4$ 30 nm/Al 100 nm. The device emitted red light with a brightness of 315 cd/m$^2$ when a forward bias voltage of 4.8 V was applied. The brightness changed to 300 cd/m$^2$ at 4.8 V (retained 95% original brightness) after continuously working for 6 hours.

What is claimed is:

1. An organic light emitting device comprising an anode, a cathode, and one or more organic compound layers sandwiched between the anode and cathode, including a light emissive layer, wherein at least one of the organic compound layers includes charge transporting material of pyrylium salt or its derivative according to the following general formula (I):

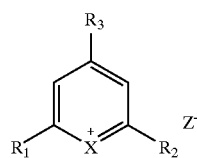

wherein R1, R2 and R3 represent an alkyl, aryl, or heteroaryl having up to 50 carbon atoms; Z represents an anionic function-including ion; and X is oxygen, sulfur, selenium or tellurium.

2. An organic light emitting device according to claim 1, wherein the derivatives include thiapyrylium, selenapyrylium, and telluropyrylium.

3. An organic light emitting device according to claim 1, wherein the pyrylium salt or its derivative is incorporated into a polymer as a unit or as a pendent side group.

4. An organic light emitting device according to claim 1, wherein the emissive layer includes a host of the pyrylium salt or its derivative.

5. An organic light-emitting device according to claim 1, wherein the pyrylium salt is 2,4,6-triphenylpyrylium salt.

6. An organic light-emitting device according to claim 1, wherein the pyrylium salt is 4,4'-bipyryllium salt.

7. An organic light emitting device comprising an emissive layer, at least one charge transport layer, an anode and a cathode, wherein the emissive layer is sandwiched between two charge transport layers, a charge transport layer and an anode, or a charge transport layer and a cathode, wherein the charge transport layer is either an electron transport layer or a hole transport layer, and wherein the charge transport layer includes a pyrylium salt or derivative according to the following general formula (I):

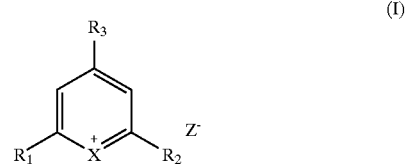

wherein R1, R2 and R3 represent and alkyl, aryl, or heteroaryl having up to 50 carbon atoms; Z represents an anionic function-including ion; and X is oxygen, sulfur, selenium or tellurium.

8. An organic light-emitting device according to claim 7, wherein the derivatives include thiapyrylium, selenapyrylium, and telluropyrylium.

9. An organic light-emitting device according to claim 7, wherein the pyrylium salt or derivative is incorporated into a polymer as a unit or as a pendent side group.

10. An organic light-emitting device according to claim 7, wherein the charge transport layer comprises a charge transport functional material and a pyrylium salt dopant.

11. An organic light-emitting device according to claim 7, wherein both of an electron transport layer and a hole transport layer are provided.

12. An organic light-emitting device according to claim 7, wherein the pyrylium salt is 2,4,6-triphenylpyrylium salt.

13. An organic light-emitting device according to claim 7, wherein the pyrylium salt is 4,4'-bipyryllium salt.

14. An organic light emitting device according to claim 1, wherein the anionic function-including ion is Cl$^-$, Br$^-$, F$^-$, tetrafluoroborate, perchlorate, methanesulfonate, or phosphohexafluoride.

15. An organic light-emitting device according to claim 7, wherein the anionic function-including ion is Cl$^-$, Br$^-$, F$^-$, tetrafluoroborate, perchlorate, methanesulfonate, or phosphohexafluoride.

* * * * *